(12) United States Patent
Shigyou et al.

(10) Patent No.: US 11,565,758 B2
(45) Date of Patent: Jan. 31, 2023

(54) UPPER VEHICLE-BODY STRUCTURE FOR VEHICLE

(71) Applicant: Mazda Motor Corporation, Hiroshima (JP)

(72) Inventors: Yasuyuki Shigyou, Aki-gun (JP); Daisuke Kiyoshita, Aki-gun (JP); Takanori Matsuura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/358,034

(22) Filed: Jun. 25, 2021

(65) Prior Publication Data

US 2022/0001934 A1   Jan. 6, 2022

(30) Foreign Application Priority Data

Jul. 1, 2020   (JP) .............................. JP2020-114227

(51) Int. Cl.

| | |
|---|---|
| *B60J 7/043* | (2006.01) |
| *B62D 25/04* | (2006.01) |
| *B62D 25/06* | (2006.01) |
| *B62D 25/02* | (2006.01) |
| *B62D 27/02* | (2006.01) |
| *B62D 27/06* | (2006.01) |

(52) U.S. Cl.
CPC .............. *B62D 25/06* (2013.01); *B60J 7/043* (2013.01); *B62D 25/025* (2013.01); *B62D 25/04* (2013.01); *B62D 27/02* (2013.01); *B62D 27/065* (2013.01)

(58) Field of Classification Search
CPC ........ B62D 25/06; B62D 25/02; B62D 25/04; B62D 27/023; B62D 27/065; B60J 7/043; B60J 7/0435; B60J 7/02; B60J 7/22

USPC ..... 296/216.1, 216.6–8, 203.1–203.4, 29, 30
See application file for complete search history.

(56) References Cited

U.S. PATENT DOCUMENTS

| | | | |
|---|---|---|---|
| 4,159,144 A | 6/1979 | Ehlen et al. | |
| 5,100,197 A * | 3/1992 | Ichinose | B60J 7/05 296/213 |

(Continued)

FOREIGN PATENT DOCUMENTS

| | | |
|---|---|---|
| DE | 102015117327 A1 | 4/2017 |
| EP | 1418076 A1 | 5/2004 |

(Continued)

OTHER PUBLICATIONS

Extended European search report dated Oct. 29, 2021, in corresponding European patent Application No. 21181736.6, 8 pages.

*Primary Examiner* — Dennis H Pedder
(74) *Attorney, Agent, or Firm* — Xsensus LLP

(57) ABSTRACT

An upper vehicle-body structure for a vehicle, the upper vehicle-body structure including a cover that fits in an opening in a roof panel of the vehicle; a sunroof device that moves the cover between one position in the opening and another position out of the opening; and a vehicle-body framework which surrounds an outer edge portion of the opening and in which corner portions are formed in a planar view. The sunroof has a unit framework in which corner portions are formed, and close portions of the unit framework to unit corner portions are coupled with close portions of the vehicle-body framework to vehicle-body corner portions.

20 Claims, 11 Drawing Sheets

(56) References Cited

U.S. PATENT DOCUMENTS

| | | | | |
|---|---|---|---|---|
| 6,481,788 | B1 * | 11/2002 | Moriyama | B62D 25/06 |
| | | | | 296/216.07 |
| 10,173,503 | B2 * | 1/2019 | Ten-Jet-Foei | B60J 1/2075 |
| 10,202,025 | B2 * | 2/2019 | Bott | B60J 7/0015 |
| 2013/0119647 | A1 | 5/2013 | Tanaka et al. | |

FOREIGN PATENT DOCUMENTS

| | | |
|---|---|---|
| FR | 3012769 A1 | 5/2015 |
| JP | 2007-186207 A | 7/2007 |

\* cited by examiner

UPPER VEHICLE-BODY STRUCTURE FOR VEHICLE

CROSS-REFERENCE TO RELATED APPLICATION

This application claims priority to JP 2020-114227, filed in Japan on Jul. 1, 2020, the entire contents of which is hereby incorporated by reference.

TECHNICAL FIELD

The present disclosure relates to an upper vehicle-body structure for a vehicle which includes a sunroof device that is formed in a roof panel and is opened and closed.

BACKGROUND

Conventionally, a roof opening-closing unit (sunroof device) includes a glass panel (cover member) being capable of opening and closing a generally rectangular opening formed in a roof panel of a vehicle.

This roof opening-closing unit has a unit framework member in a generally rectangular shape in a planar view, the unit framework member being composed of a pair of left and right side frames, a front-side member coupling front end portions of the pair of side frames together in a vehicle width direction, and a rear-side member coupling rear end portions of the pair of side frames together in the vehicle width direction, and is installed in a vehicle body via this unit framework member.

A conventional automobile roof structure includes a sunroof housing retainer which is formed in a generally annular shape so as to surround a generally rectangular opening formed in a roof panel and includes a rear portion (rear-side member) with a wide bead in a rear part, generally central portions of a pair of side portions (side frames) extending in a front-rear direction are respectively supported by a pair of roof side rails via a first sunroof bracket, and both of left and right end portions of the rear portion are respectively supported by the pair of roof side rails via a second sunroof bracket.

A sunshade device for blocking sunlight taken in through a glass panel is provided in a vehicle in which the roof opening-closing unit is installed. This sunshade device is usually composed of a shade (light-shielding sheet) covering an opening, a roll-screen shade portion winding this shade in a retractable manner, an accommodation portion accommodating the roll-screen shade portion and the shade together, and so forth.

The rear-side member of the roof opening-closing unit as the unit framework member is caused to serve as a shade accommodation portion as well, thereby forming a roof opening-closing unit with a sunshade.

SUMMARY

In an exemplary implementation of an upper vehicle-body structure for a vehicle in accordance with the present disclosure, the upper vehicle-body structure includes a cover that fits in an opening in a roof panel of the vehicle; a sunroof device that moves the cover between one position in the opening and another position out of the opening; and a vehicle-body framework which surrounds an outer edge portion of the opening and in which corner portions are formed in a planar view. The sunroof has a unit framework in which corner portions are formed, and close portions of the unit framework to unit corner portions are coupled with close portions of the vehicle-body framework to vehicle-body corner portions.

DETAILED DESCRIPTION OF THE DRAWINGS

Figure 1:
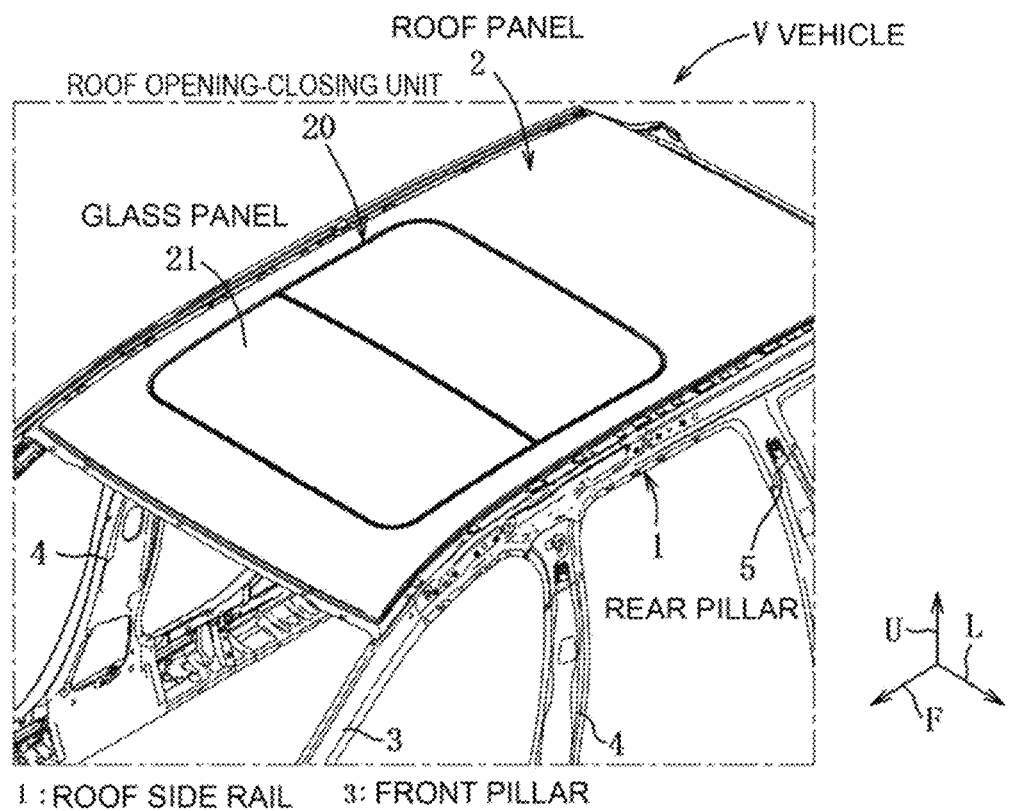
FIG. 1 is a perspective view of an upper vehicle-body structure for a vehicle according to the present disclosure.

To improve vehicle in-cabin comfort for an occupant and to increase spaciousness felt by the occupant and sunlight taken into a cabin, conventionally a method is used in which an opening area of a sunroof opening formed in a roof panel is made larger than that of a usual case.

In an outer periphery close region, a so-called outer edge portion, of the sunroof opening, a vehicle-body framework member is present in which corner portions are formed in a planar view. This vehicle-body framework member is composed of a pair of left and right roof side rails extending in a vehicle front-rear direction, a front header coupling front end portions of the pair of roof side rails together in a vehicle width direction, and a roof reinforcement coupling rear-side intermediate portions of the pair of roof side rails together.

Meanwhile, in vehicle traveling, an input load in an up-down direction which is input through a suspension via a wheel is propagated through each framework member configuring a vehicle, such as a pillar member, and is transmitted to the vehicle-body framework member such as the roof side rails arranged in the outer periphery close region of the opening. Furthermore, in a case where the sunroof opening is made large, because a panel region present between an edge portion of the opening and the vehicle-body framework member is small, apparent rigidity of the vehicle-body framework member lowers, and deformation of the vehicle-body framework member increases.

Thus, an opening or closing deformation in which an angle formed between a front edge portion and a side edge portion of the opening or an angle formed between a rear edge portion and the side edge portion largely changes, in other words, rhombic deformation might occur to the sunroof opening.

The inventors have developed technology as described in the present disclosure that provides an upper vehicle-body structure for a vehicle or the like which realizes both of in-cabin comfort and upper vehicle-body rigidity.

An upper vehicle-body structure for a vehicle in accordance with the present disclosure includes a roof opening-closing unit which has a cover member being capable of opening and closing a generally rectangular opening formed in a roof panel; and a vehicle-body framework member which surrounds an outer edge portion of the opening and in which corner portions are formed in a planar view, characterized in that the roof opening-closing unit has a unit framework member which is in a generally rectangular shape in a planar view and in which corner portions are formed and close portions of the unit framework member to unit corner portions are coupled with close portions of the vehicle-body framework member to vehicle-body corner portions.

In this upper vehicle-body structure for a vehicle, because the roof opening-closing unit has the unit framework member which is in a generally rectangular shape in a planar view and in which the corner portions are formed, the cover member can be set wide, and rigidity of the roof opening-closing unit can be maintained high even when the cover member has a wide opening.

Because the close portions of the unit framework member to the unit corner portions are coupled with the close portions of the vehicle-body framework member to the vehicle-body corner portions, rigidity of the vehicle-body framework member can be reinforced by using the rigidity of the roof opening-closing unit, and rhombic deformation of the opening can be inhibited.

In accordance with upper vehicle-body structure of the present disclosure, a vehicle body has a pair of left and right pillars extending in an up-down direction and the close portions of the vehicle-body framework member to the vehicle-body corner portions are coupled with the pillars. With this configuration, the close portions of the vehicle-body framework member to rear-side vehicle-body corner portions can be coupled with the pillars in addition to the close portions to the unit corner portions, and rhombic deformation of the opening can further be inhibited.

In accordance with upper vehicle-body structure of the present disclosure, the vehicle-body framework member includes a pair of left and right roof side rails extending in a vehicle front-rear direction, a front header coupling front end portions of the pair of roof side rails together in a vehicle width direction, and a roof reinforcement coupling rear-side intermediate portions of the pair of roof side rails together in the vehicle width direction, the unit framework member is coupled with the vehicle-body framework member via a pair of left and right front-side brackets and a pair of left and right rear-side brackets, and the front-side bracket is fastened to the front header at two vehicle-body-side fastening points aligned in the vehicle width direction. With this configuration, the close portions of the vehicle-body framework member to front-side vehicle-body corner portions can be coupled with the front header in addition to the close portions to the unit corner portions, and rhombic deformation of the opening can further be inhibited.

In accordance with upper vehicle-body structure of the present disclosure, the front-side bracket is fastened to the unit framework member at at least two unit-side fastening points aligned in the vehicle front-rear direction, one vehicle-body-side fastening point of the vehicle-body-side fastening points is disposed in a close position to an extension line connecting the two unit-side fastening points, and a remaining vehicle-body-side fastening point of the vehicle-body-side fastening points is disposed in a position on a vehicle-width-direction outer side of the extension line. With this configuration, the unit framework member is pulled from a vehicle-width-direction outer side, and torsional deformation of the roof opening-closing unit can thereby be inhibited.

In accordance with upper vehicle-body structure of the present disclosure, the front-side bracket has a bead extending in the vehicle front-rear direction between the two vehicle-body-side fastening points and a flange portion bent in an up-down direction in a vehicle-width-direction outer side end. With this configuration, displacement of the close portion of the unit framework member to a front-side unit corner portion can be inhibited.

In accordance with upper vehicle-body structure of the present disclosure, the front header has a pair of left and right front gussets connected with the pair of roof side rails in both end side portions in the vehicle width direction, the roof reinforcement has a pair of left and right rear gussets connected with the pair of roof side rails in both end side portions in the vehicle width direction, the front gusset corresponds to the close portion to the vehicle-body corner portion on a front side, and the rear gusset corresponds to the close portion to the vehicle-body corner portion on a rear side. With this configuration, the unit framework member and the vehicle-body framework member can be coupled together via the front gussets and the rear gussets.

In accordance with upper vehicle-body structure of the present disclosure, the unit framework member includes a pair of left and right side frames extending in a vehicle front-rear direction, a front-side member coupling front end portions of the pair of side frames together in a vehicle width direction, and a shade accommodation portion coupling rear end portions of the pair of side frames together in the vehicle width direction, a connecting portion between the front-side member and the side frame corresponds to the close portion to the unit corner portion on a front side, and a vehicle-width-direction outer-side portion of the shade accommodation portion corresponds to the close portion to the unit corner portion on a rear side. With this configuration, the unit framework member and the vehicle-body framework member can be coupled together via connecting portions between the front-side member and the side frames and connecting portions between the shade accommodation portion and the side frames.

An upper vehicle-body structure for a vehicle in accordance with the present disclosure realizes both of in-cabin comfort and upper vehicle-body rigidity by reinforcing rigidity of a vehicle-body framework member by using rigidity of a roof opening-closing unit.

Embodiments of the present disclosure will hereinafter be described in detail based on drawings.

The following descriptions describe examples where the present disclosure is applied to an upper vehicle-body structure for a vehicle but do not restrict the present disclosure, application thereof, or use thereof.

Figure 2:
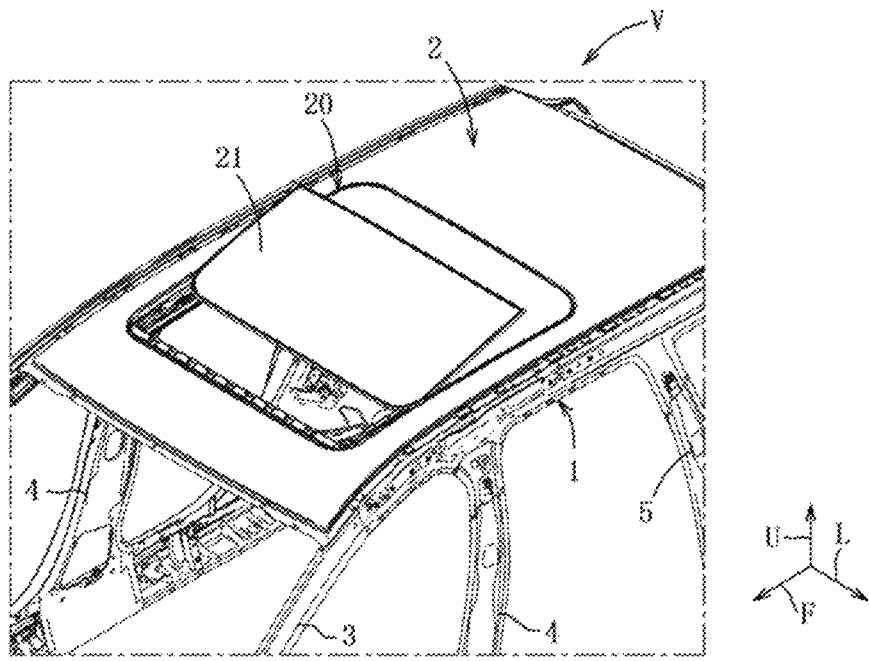
FIG. 2 is a diagram corresponding to FIG. 1 in a case where a tilting-up operation is performed for a glass panel.
Figure 4:
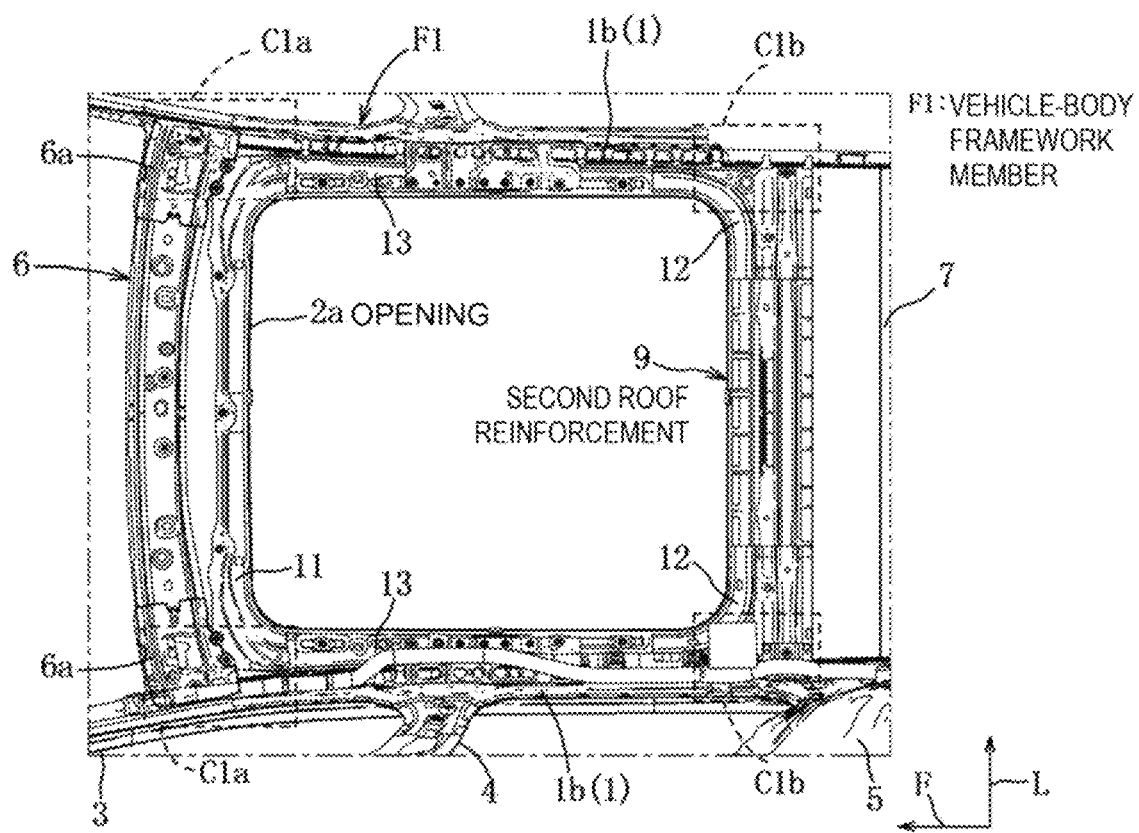
FIG. 4 is a diagram corresponding to FIG. 3, from which a first roof reinforcement and a roof opening-closing unit are omitted.

As illustrated in FIG. 1 and FIG. 2, a vehicle V is a four-door passenger vehicle including a pair of left and right roof side rails 1 extending in a front-rear direction, a roof panel 2 placed between the pair of roof side rails 1, a pair of left and right front pillars 3 respectively extending from front end portions of the pair of roof side rails 1 to a lower front side, a pair of left and right center pillars 4 respectively extending downward from middle portions of the pair of roof side rails 1, a pair of left and right rear pillars 5 respectively extending downward from rear end portions of the pair of roof side rails 1, a roof opening-closing unit 20 in which an opening 2a formed in the roof panel 2 is capable of being opened and closed, and so forth. Opening 2a is illustrated in FIG. 4. In an exemplary implementation, the roof opening-closing unit 20 is a sunroof device that opens and closes opening 2a forming in roof panel 2. In the following, descriptions will be made while in the drawings, the direction of an arrow F indicates the front in a vehicle front-rear direction, the direction of an arrow L indicates the left in a vehicle width direction, and the direction of an arrow U indicates the upper side in a vehicle up-down direction.

First, a description will be made about an outline configuration of the vehicle V according to the present disclosure.

Figure 7:
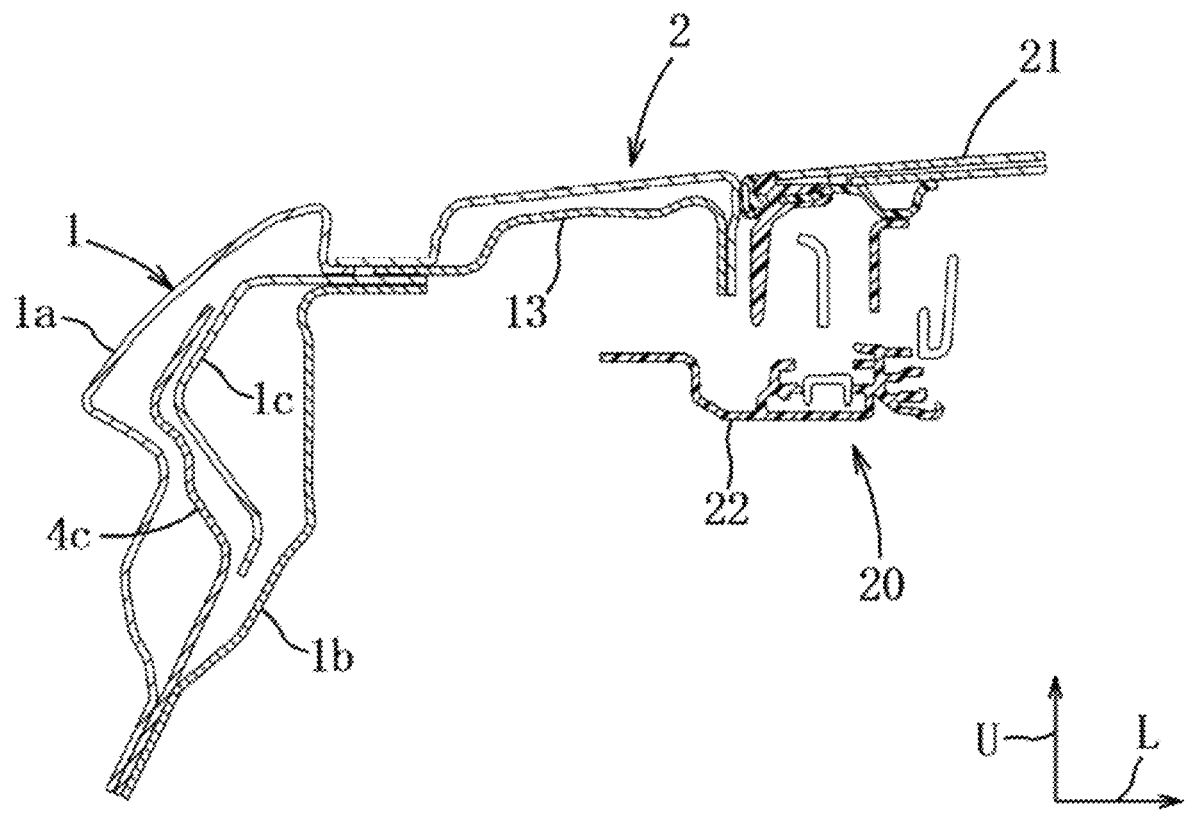
FIG. 7 is a cross-sectional view taken along line VII-VII in FIG. 3.
Figure 8:
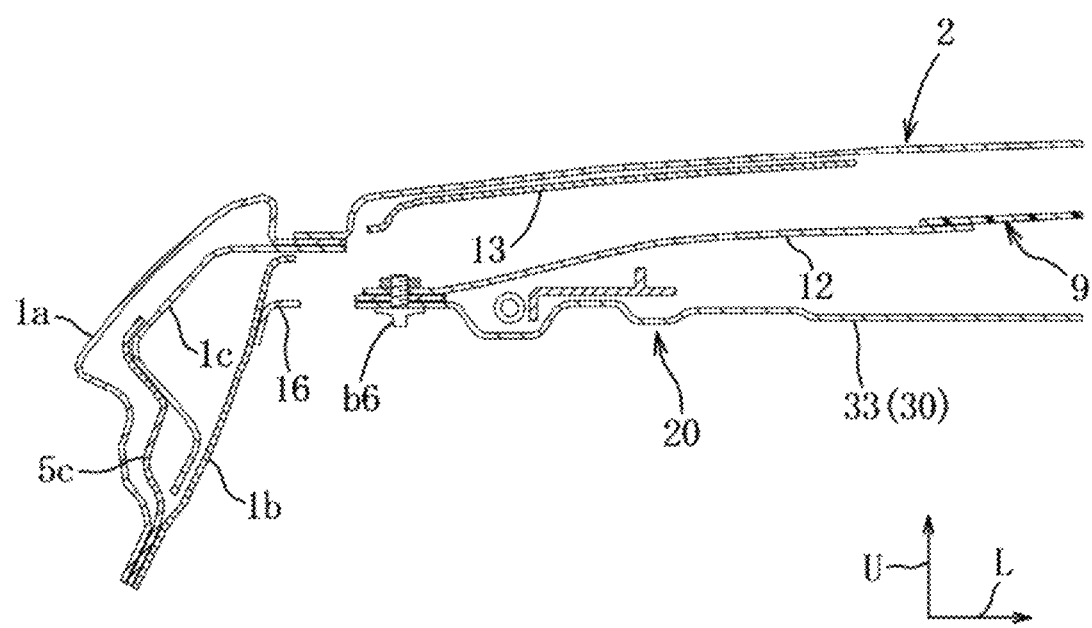
FIG. 8 is a cross-sectional view taken along line VIII-VIII in FIG. 3.

As illustrated in FIG. 7 and FIG. 8, the roof side rail 1 has a roof rail outer 1a, a roof rail inner 1b which forms a closed cross-section extending in the front-rear direction while cooperating with this roof rail outer 1a, and a roof rail reinforcement 1c as a reinforcement member whose upper end portion is held between the roof rail outer 1a and the roof rail inner 1b and which demarcates the closed cross-section of the roof side rail 1 in the vehicle width direction. Both of left and right end portions of the roof panel 2 are joined, by welding, to vehicle-width-direction inner side ends of the pair of roof rail outers 1a.

Figure 3:
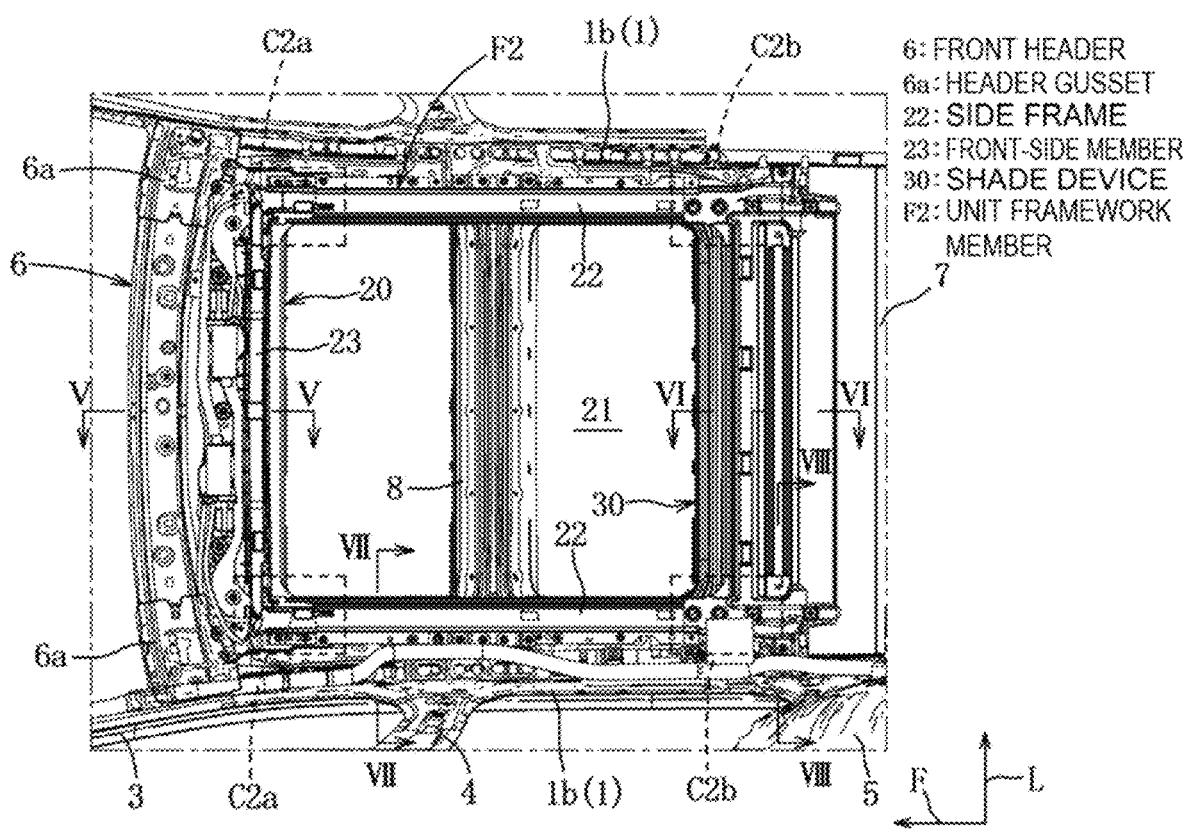
FIG. 3 is a bottom view of the upper vehicle-body structure.

As illustrated in FIG. 3 and FIG. 4, the pair of roof side rails 1 are coupled together in the vehicle width direction by a front header 6 extending in a left-right direction, a rear header 7 extending in the left-right direction, and first and second roof reinforcements 8 and 9 extending in the left-right direction.

Figure 5:
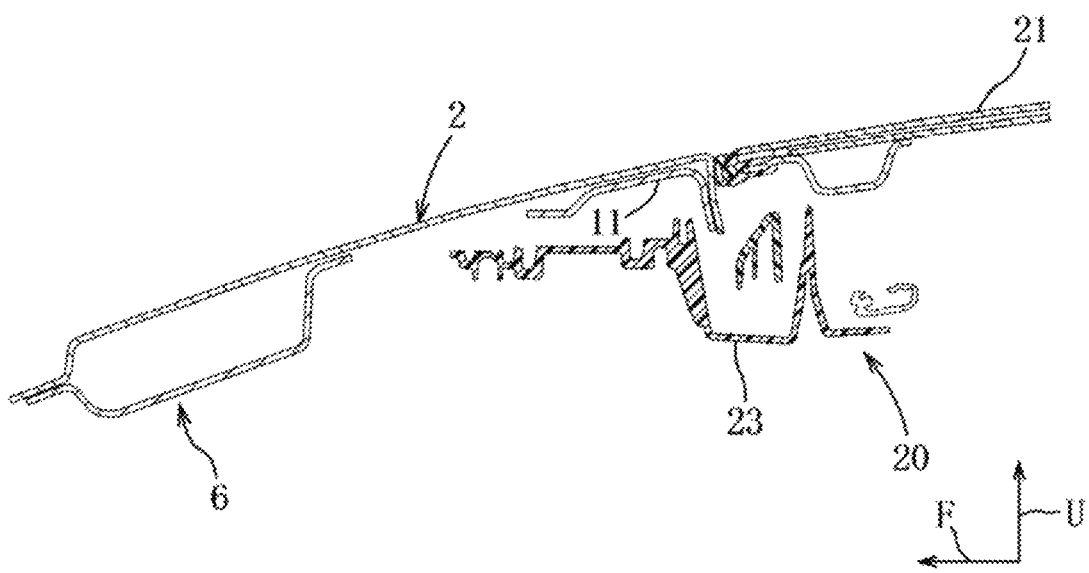
FIG. 5 is a cross-sectional view taken along line V-V in FIG. 3.

As illustrated in FIG. 3, FIG. 4, FIG. 9, and FIG. 11, the front header 6 has a pair of header gussets 6a formed of metal in both of left and right end portions and is connected with the pair of roof rail inners 1b respectively via the pair of header gussets 6a. As illustrated in FIG. 5, the front header 6 is formed to have a generally hat-shaped cross-section and forms a generally rectangular closed cross-section extending in the left-right direction while cooperating with a front end portion of the roof panel 2. Similarly to the front header 6, the rear header 7 is formed to have a generally hat-shaped cross-section and forms a closed cross-section extending in the left-right direction while cooperating with a rear end portion of the roof panel 2.

The first and second roof reinforcements 8 and 9 are roof reinforcement members.

The first roof reinforcement 8 is composed of a closed cross-sectional structure made of two iron plate materials.

As illustrated in FIG. 3 and FIG. 4, the first roof reinforcement 8 is configured to couple the pair of roof side rails 1 together in close positions to connection portions between the roof side rails 1 and the center pillars 4, in other words, in a central position of the opening 2a in the front-rear direction.

The second roof reinforcement 9 is composed of an iron plate-shaped structure.

As illustrated in FIG. 4, FIG. 6, FIG. 8 and FIG. 12, the second roof reinforcement 9 is configured to couple the pair of roof side rails 1 together in close positions to connection portions between the roof side rails 1 and the rear pillars 5, in other words, in a back end position of the opening 2a in the front-rear direction. This second roof reinforcement 9 has a pair of rear fixing plates 12 in both of left and right end portions and is connected with the pair of roof rail inners 1b via the pair of rear fixing plates 12.

The rear fixing plate 12 formed of iron is formed into a general L-shape in a planar view.

The rear fixing plates 12 reinforce an outer edge portion of the opening 2a from a back surface of the roof panel 2 while cooperating with a front fixing plate 11 formed of iron and a pair of left and right side fixing plates 13. The front fixing plate 11 is formed into a general U-shape in a planar view and is connected with the front header 6. The side fixing plate 13 is formed into a general I-shape in a planar view and is connected with the roof rail inner 1b. Those fixing plates 11 to 13 configure reinforcement members for mounting the roof opening-closing unit 20.

As illustrated in FIG. 4, in the roof panel 2, the opening 2a in a general rectangular shape in a planar view is formed from a close position to the front header 6 to the close positions to the connection portions between the roof side rails 1 and the rear pillars 5. The outer edge portion of this opening 2a is surrounded by a vehicle-body framework member F1.

The pair of roof side rails 1, the front header 6, and the second roof reinforcement 9 correspond to the vehicle-body framework member F1. This vehicle-body framework member F1 has a pair of left and right front-side vehicle-body corner portions C1a composed of the pair of roof side rails 1 and the front header 6 and a pair of left and right rear-side vehicle-body corner portions C1b composed of the pair of roof side rails 1 and the second roof reinforcement 9 (the rear fixing plates 12).

The front pillar 3 extends from an upper end portion of a hinge pillar to an upper rear side and is coupled with the roof side rail 1 and the header gusset 6a. This front pillar 3 forms a closed cross-section by an outer panel and an inner panel and has a pillar reinforcement for reinforcement in this closed cross-section. The center pillar 4 extends upward from a side sill and is coupled with the roof side rail 1. This center pillar 4 forms a closed cross-section by an outer panel and an inner panel and has a pillar reinforcement 4c for reinforcement to be coupled with the roof rail reinforcement 1c in this closed cross-section (see FIG. 7). The rear pillar 5 extends upward from the side sill and is coupled with the roof side rail 1. This rear pillar 5 forms a closed cross-section by an outer panel and an inner panel and has a pillar reinforcement 5c for reinforcement to be coupled with the roof rail reinforcement 1c in this closed cross-section (see FIG. 8).

Next, the roof opening-closing unit 20 will be described.

The roof opening-closing unit 20 has a tilting-up mechanism which changes a posture of a front-half portion of a transparent glass panel 21 (cover member) into a shape inclined upward toward the rear and operates the glass panel 21 to partially open, an opening mechanism which causes the front-half portion of the glass panel 21 to overlap with a rear-half portion and operates the glass panel 21 to fully open, and a sunshade mechanism which blocks sunlight transmitted through the glass panel 21.

As illustrated in FIG. 1 to FIG. 3, the roof opening-closing unit 20 has, as main configuration elements, the glass panel 21 composed of the front-half portion and the rear-half portion, a pair of left and right side frames 22, a front-side member 23 coupling front end portions of the pair of side frames 22 together in the vehicle width direction, a shade device 30 coupling rear end portions of the pair of side frames 22 together in the vehicle width direction, and so forth.

As illustrated in FIG. 7, the side frame 22 is configured to have a generally U-shaped cross-section. This side frame 22 is formed of an aluminum alloy material by extrusion.

As illustrated in FIG. 5, the front-side member 23 is configured to have a generally U-shaped cross-section. This front-side member 23 is molded by using a synthetic resin material.

Figure 6:
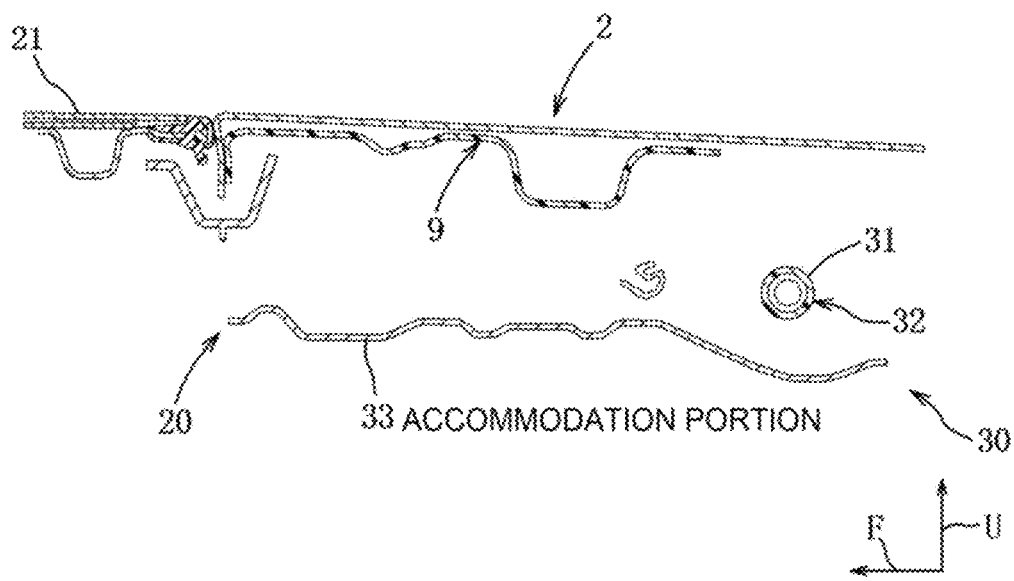
FIG. 6 is a cross-sectional view taken along line VI-VI in FIG. 3.

As illustrated in FIG. 6, the shade device 30 is formed into a generally rectangular cuboid shape with a sheet-shaped shade 31 covering a lower surface of the glass panel 21, a roll-screen shade portion 32 winding this shade 31 in a drawable manner, an accommodation portion 33 which is formed of iron and accommodates the shade 31 and the roll-screen shade portion 32. A bottom plate portion of the accommodation portion 33 bears the shade 31 and the roll-screen shade portion 32 from a lower side.

As illustrated in FIG. 3, the roof opening-closing unit 20 secures rigidity by a unit framework member F2. The pair of side frames 22, the front-side member 23, and the shade device 30 correspond to the unit framework member F2. This unit framework member F2 has a pair of left and right front-side unit corner portions C2a composed of the pair of side frames 22 and the front-side member 23 and a pair of left and right rear-side unit corner portions C2b composed of the pair of side frames 22 and the shade device 30.

As illustrated in FIG. 9 to FIG. 12, the roof opening-closing unit 20 is mounted on the vehicle-body framework member F1 via a pair of left and right front-side brackets 15 and a pair of left and right rear-side brackets 16.

Specifically, as illustrated in FIG. 3 and FIG. 4, close regions to the front-side unit corner portions C2a are fixed to close regions to the front-side vehicle-body corner portions C1a via the front-side brackets 15, and close regions to the rear-side unit corner portions C2b are fixed to close regions to the rear-side vehicle-body corner portions C1b via the rear-side brackets 16.

The front-side bracket 15 will be described.

Figure 13:
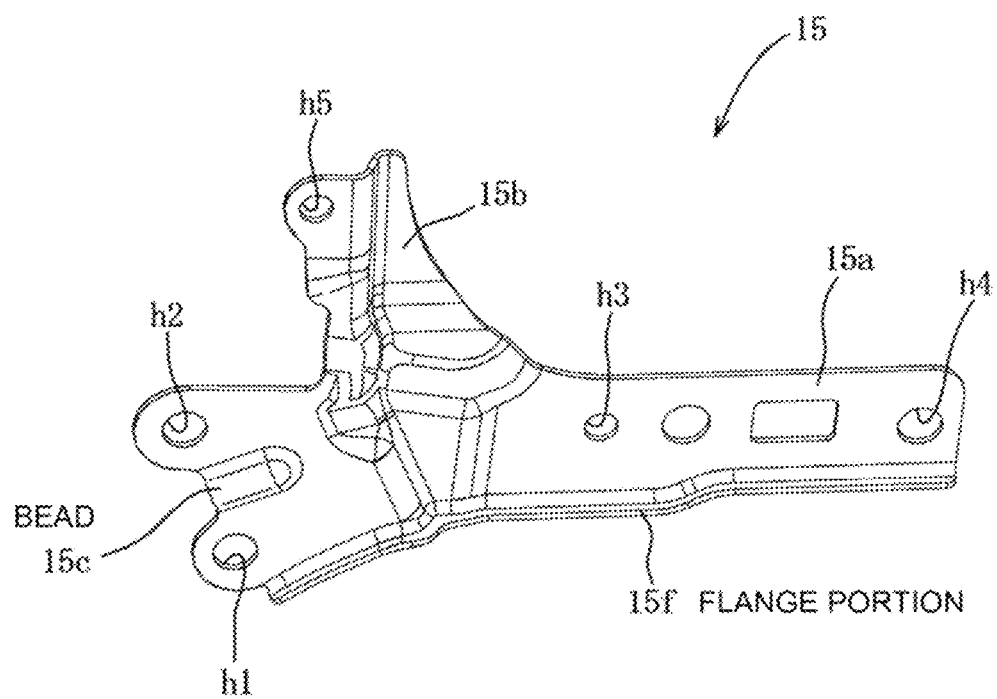
FIG. 13 is a perspective view of a front-side bracket.

As illustrated in FIG. 13, the front-side bracket 15 is made of an iron plate material and includes a body portion 15a extending in the front-rear direction and a protruding portion 15b protruding from a front-side portion of this body portion 15a to a vehicle-width-direction inner side.

The body portion 15a has a pair of bolt holes h1 and h2 aligned in the left-right direction in a front end portion and a pair of bolt holes h3 and h4 aligned in the front-rear direction in a rear-half portion. The body portion 15a includes a bead 15c formed between the pair of bolt holes h1 and h2 and a flange portion 15f formed in a vehicle-width-direction outer side end. The bead 15c bulges downward and extends in the front-rear direction. The flange portion 15f is formed to be bent downward from a front end to a back end of the body portion 15a.

The protruding portion 15b has a single bolt hole h5 in a vehicle-width-direction inner side portion.

Bolts b1 to b5 are respectively inserted through the bolt holes h1 to h5.

Figure 14:
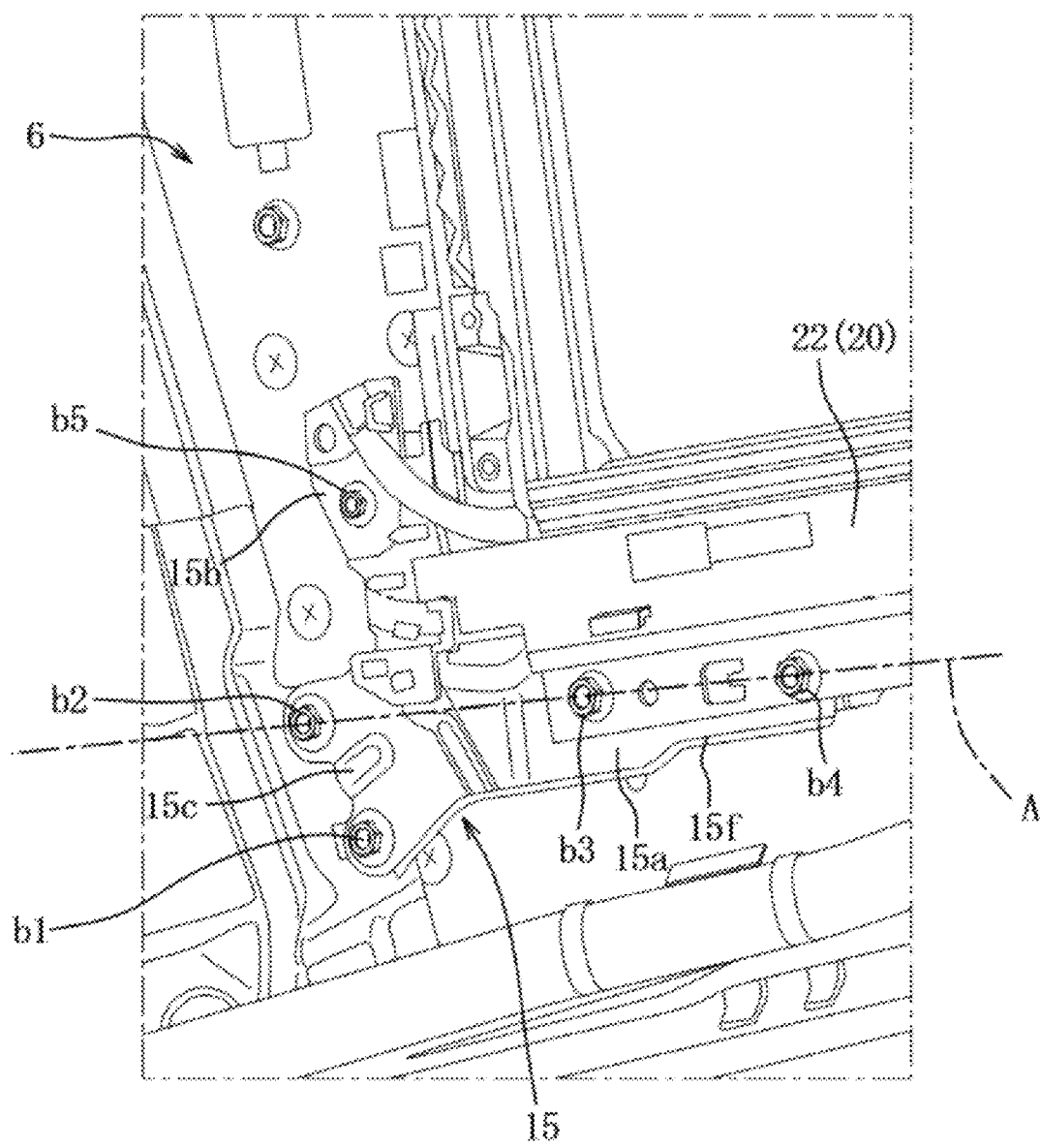
FIG. 14 is a mounted state diagram of the front-side bracket.

As illustrated in FIG. 14, the bolt hole h2 is formed on an extension line A connecting the pair of bolt holes h3 and h4 (bolts b3 and b4), and the bolt hole h1 is formed on a vehicle-width-direction outer side of the bolt hole h2.

Figure 9:
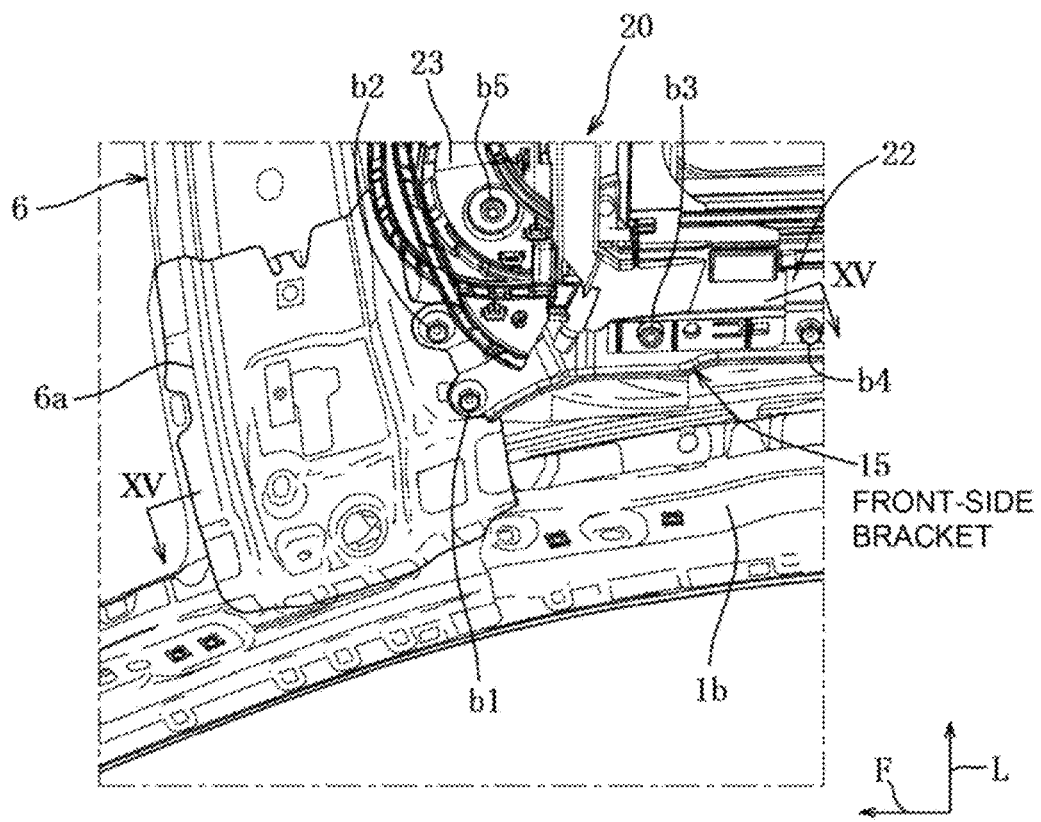
FIG. 9 is an enlarged view of front-side principal components in FIG. 3.
Figure 11:
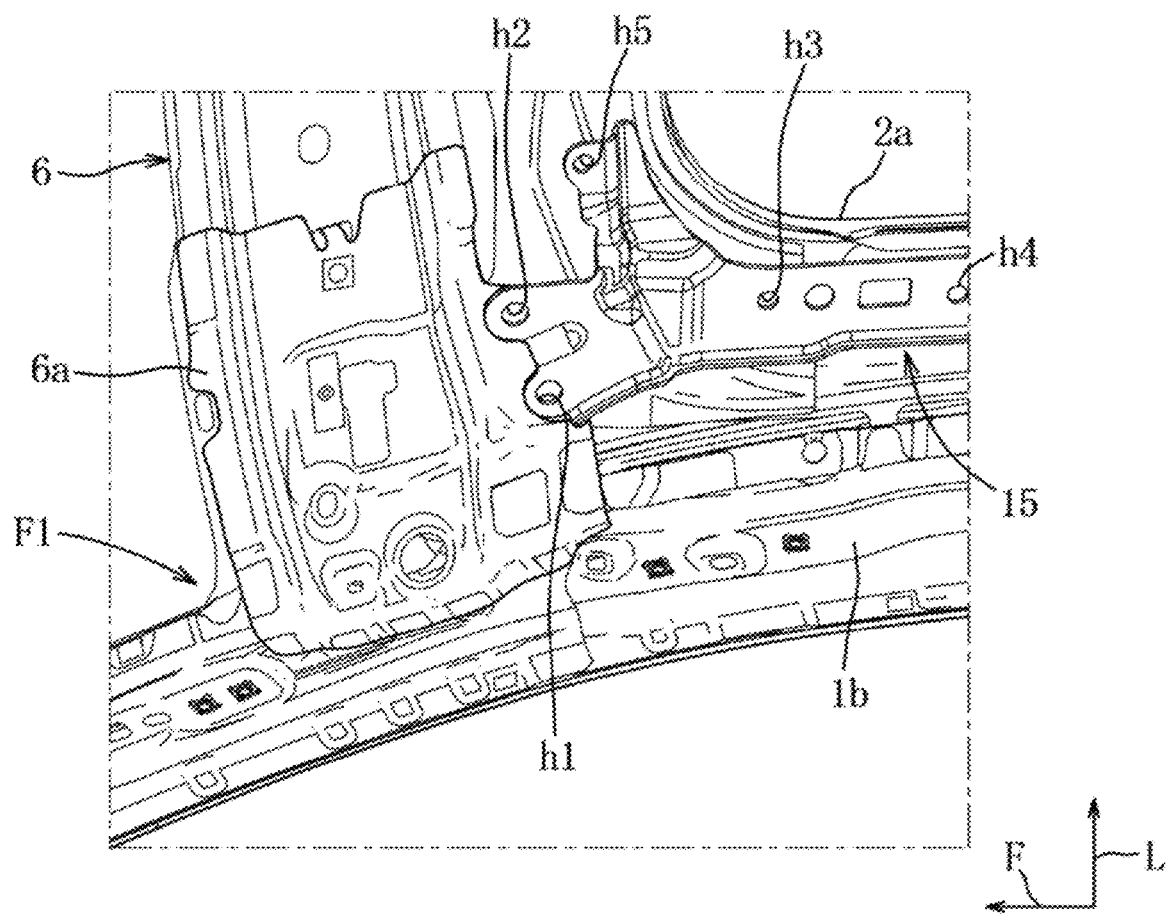
FIG. 11 is an enlarged view of front-side principal components in FIG. 4.
Figure 15:
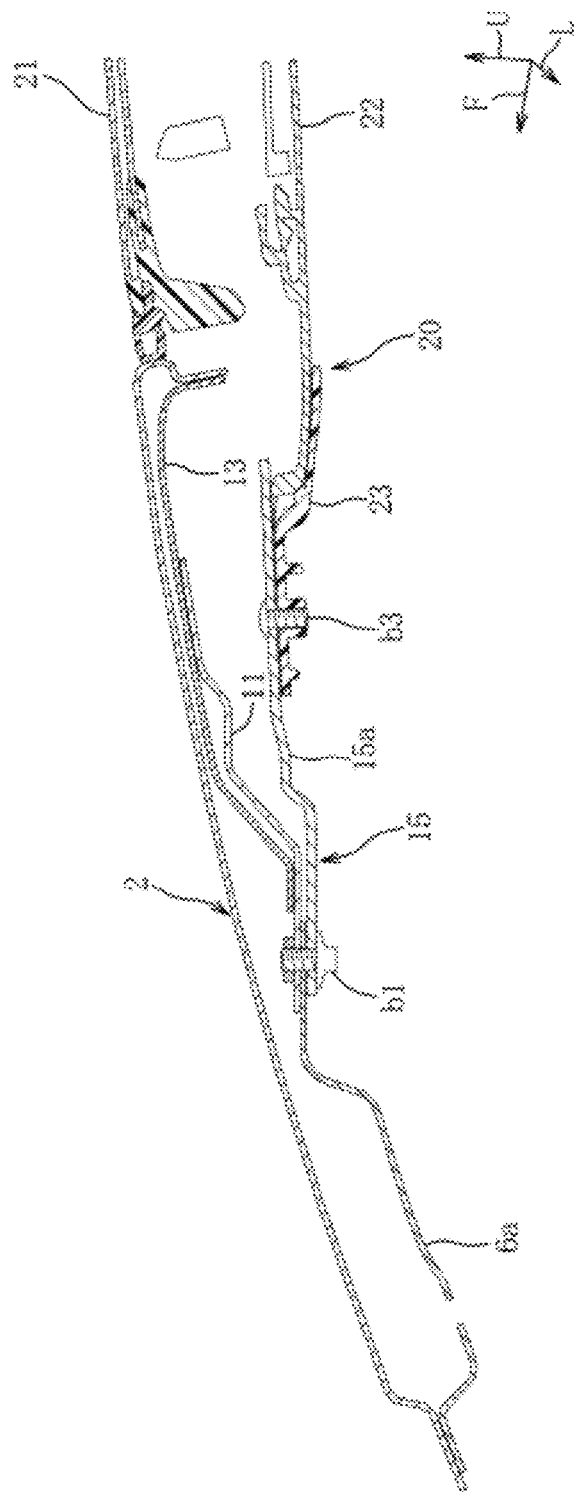
FIG. 15 is a cross-sectional view taken along line XV-XV in FIG. 9.

As illustrated in FIG. 9, FIG. 11, and FIG. 15, the front-side bracket 15 is fastened and fixed, from a lower side, to a rear end portion of the header gusset 6a and a front end portion of the front fixing plate 11 (the close region to the front-side vehicle-body corner portion C1a) via the bolts b1 and b2 inserted through the bolt holes h1 and h2. Thus, the header gusset 6a and the front fixing plate 11 correspond to a front gusset.

A close portion of the front-side member 23 to the front-side unit corner portion C2a is fastened and fixed, from a lower side, to the front-side bracket 15 via the bolts b3 to b5 inserted through the bolt holes h3 and h5.

The bolts b3 and b4 fasten the front-side bracket 15, the side frame 22, and the front-side member 23 together. Here, the bolt holes h1 and h2 correspond to vehicle-body-side fastening points of the front-side bracket 15, and the bolt holes h3 to h5 correspond to unit-side fastening points of the front-side bracket 15.

The rear-side bracket 16 will be described.

The rear-side bracket 16 is made of an iron plate material and is formed to have a generally hat-shaped cross-section.

Figure 10:
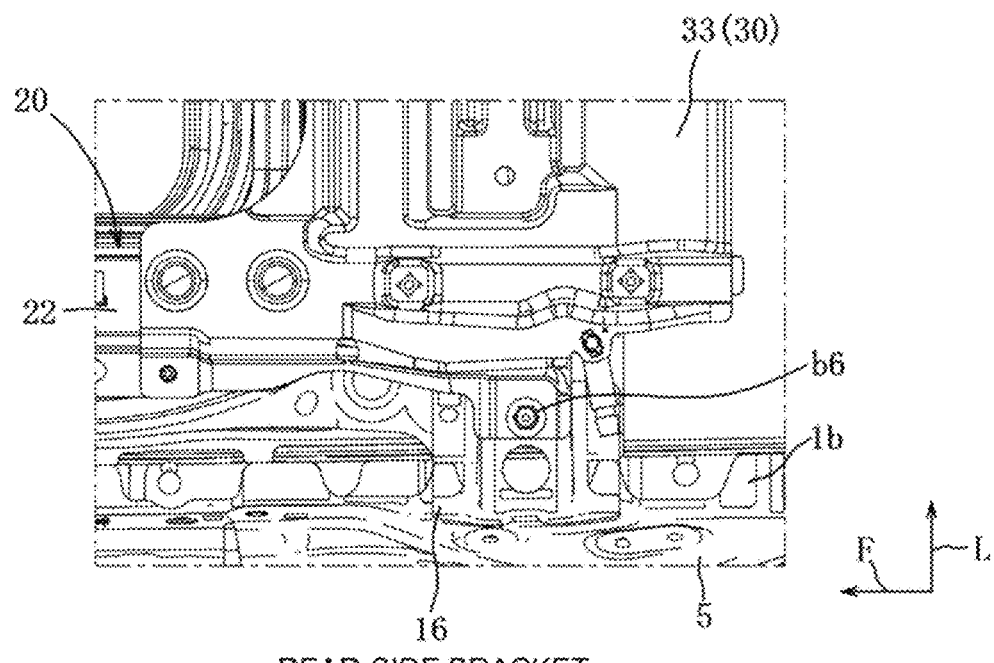
FIG. 10 is an enlarged view of rear-side principal components in FIG. 3.
Figure 12:
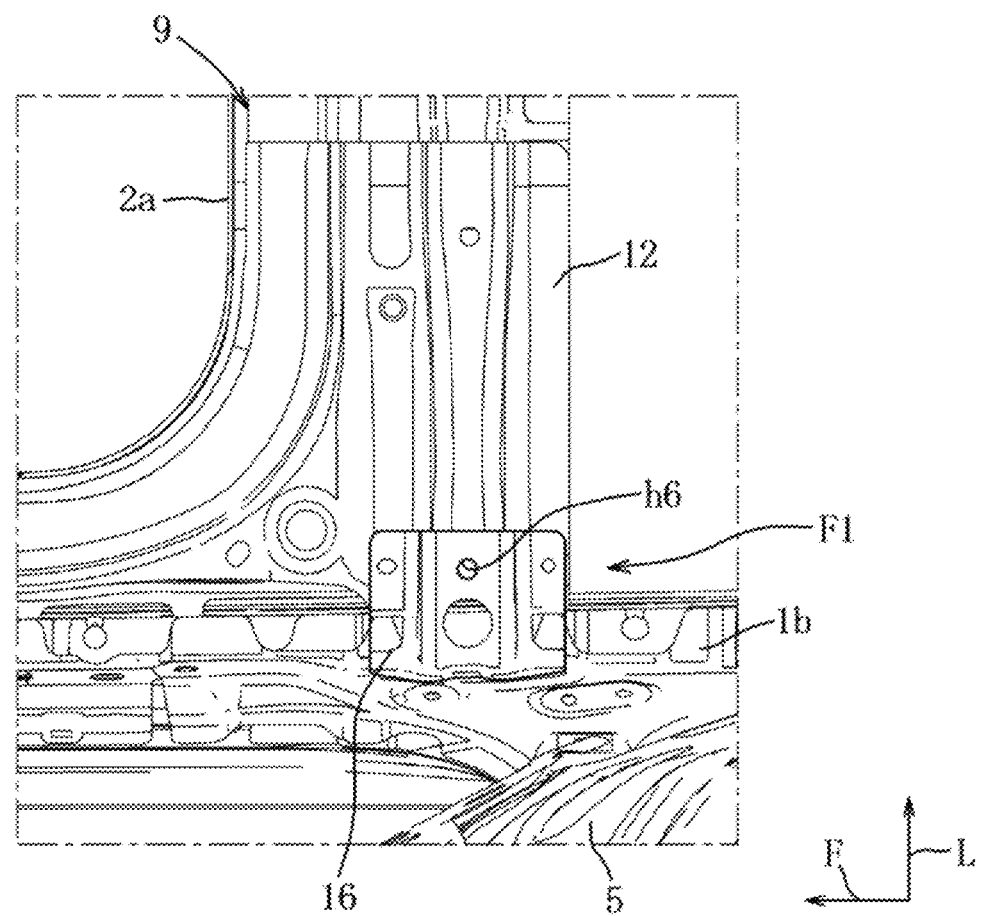
FIG. 12 is an enlarged view of rear-side principal components in FIG. 4.

As illustrated in FIG. 8, FIG. 10, and FIG. 12, the rear-side bracket 16 is fastened and fixed, from a lower side, to a vehicle-width-direction outer side end of the rear fixing plate 12 (the close region to the rear-side vehicle-body corner portion C1b) via a bolt b6 inserted through a bolt hole h6.

A close portion of the accommodation portion 33 (shade device 30) to the rear-side unit corner portion C2b is fastened and fixed, from a lower side, to the rear-side bracket 16 via the bolt b6 inserted through the bolt hole h6.

The bolt b6 fastens the accommodation portion 33 and the rear fixing plate 12 together with the rear-side bracket 16 interposed therebetween. Thus, the rear fixing plate 12 corresponds to a rear gusset.

Next, a description will be made about actions and effects of an upper vehicle-body structure for the vehicle V according to the present disclosure. Because the roof opening-closing unit 20 has the unit framework member F2 which is in a generally rectangular shape in a planar view and in which the corner portions are formed, the glass panel 21 can be set wide, and rigidity of the roof opening-closing unit 20 can be maintained high even when the glass panel 21 has a wide opening. Because close portions of the unit framework member F2 to the unit corner portions C2a and C2b are coupled with close portions of the vehicle-body framework member F1 to the vehicle-body corner portions C1a and C1b, rigidity of the vehicle-body framework member F1 can be reinforced by using the rigidity of the roof opening-closing unit 20, and rhombic deformation of the opening 2a can be inhibited.

A vehicle body has, in a rear part, the pair of left and right rear pillars 5 extending in an up-down direction, and the close portions of the vehicle-body framework member F1 to the rear-side vehicle-body corner portions C1b are coupled with the rear pillars 5. Thus, the close portions of the vehicle-body framework member F1 to the rear-side vehicle-body corner portions C1b can be coupled with the rear pillars 5 in addition to the close portions to the rear-side unit corner portions C2b, and rhombic deformation of the opening 2a can further be inhibited.

The vehicle-body framework member F1 includes the pair of left and right roof side rails 1 extending in the front-rear direction, the front header 6 coupling the front end portions of the pair of roof side rails 1 together in the vehicle width direction, and the second roof reinforcement 9 coupling rear-side intermediate portions of the pair of roof side rails 1 together in the vehicle width direction, the unit framework member F2 is coupled with the vehicle-body framework member F1 via the pair of left and right front-side brackets 15 and the pair of left and right rear-side brackets 16, and the front-side bracket 15 is fastened to the front header 6 at the two bolt holes h1 and h2 aligned in the vehicle width direction. Thus, the close portions of the vehicle-body framework member F1 to the front-side vehicle-body corner portions C1a can be coupled with the front header 6 in addition to the close portions to the front-side unit corner portions C2a, and rhombic deformation of the opening 2a can further be inhibited.

The front-side bracket 15 is fastened to the unit framework member F2 at least two bolt holes h3 and h4 aligned in the front-rear direction, the bolt hole h2 between the bolt holes h1 and h2 is disposed in a close position to the extension line A connecting the two bolt holes h3 and h4, and the bolt hole h1 between the bolt holes h1 and h2 is disposed in a position on the vehicle-width-direction outer side of the extension line A. Thus, the unit framework member F2 is pulled from the vehicle-width-direction outer side, and torsional deformation of the roof opening-closing unit 20 can thereby be inhibited.

The front-side bracket 15 has the bead 15c extending in the vehicle front-rear direction between the bolt holes h1 and h2 and the flange portion 15f bent in the up-down direction in the vehicle-width-direction outer side end. Thus, displacement of the close portion of the unit framework member F2 to the front-side unit corner portion C2a can be inhibited.

The front header 6 has the header gussets 6a which correspond to a pair of left and right front gussets connected with the pair of roof side rails 1 in both end side portions in the vehicle width direction, the second roof reinforcement 9 has the rear fixing plates 12 which correspond to a pair of left and right rear gussets connected with the pair of roof side rails 1 in both end side portions in the vehicle width direction, the header gusset 6a corresponds to the close portion to the front-side vehicle-body corner portion C1a, and the rear fixing plate 12 corresponds to the close portion to the rear-side vehicle-body corner portion C1b. Accordingly, the unit framework member F2 and the vehicle-body framework member F1 can be coupled together via the header gussets 6a and the rear fixing plates 12.

The unit framework member F2 includes the pair of left and right side frames 22 extending in the front-rear direction, the front-side member 23 coupling the front end portions of the pair of side frames 22 together in the vehicle width direction, and the accommodation portion 33 (shade device 30) coupling the rear end portions of the pair of side frames 22 together in the vehicle width direction, a connecting portion between the front-side member 23 and the side frame 22 corresponds to the close portion to the front-side unit corner portion C2a, and a vehicle-width-direction outer-side portion of the accommodation portion 33 corresponds to the close portion to the rear-side unit corner portion C2b. Accordingly, the unit framework member F2 and the vehicle-body framework member F1 can be coupled together via connecting portions between the front-side member 23 and the side frames 22 and vehicle-width-direction outer-side portions of the accommodation portion 33.

Next, a description will be made about possible modifications to the systems and devices previously discussed.

1] An example is described where the unit framework member F2 is composed of the pair of side frames 22, the front-side member 23, and the shade device 30; however, the shade device 30 does not necessarily have to be included, but the unit framework member F2 may be composed of a pair of side frames, a front-side member coupling front end portions of the pair of side frames together, and a rear-side member which couples rear end portions of the pair of side frames together and does not have a shade device function.

2] An example is described where the roof opening-closing unit 20 has the tilting-up mechanism, which changes the posture of the front-half portion of the transparent glass panel 21 into a shape inclined upward toward the rear and operates the glass panel 21 to partially open, and an opening mechanism, which causes the front-half portion of the glass panel 21 to overlap with the rear-half portion and operates the glass panel 21 to fully open; however, the tilting-up mechanism does not necessarily have to be included, but a roof opening-closing unit may include only the opening mechanism which operates the glass panel 21 to fully open.

3] Other than those, a person skilled in the art would be capable of realizing forms in which various changes are added or combined together without departing from the gist of the present disclosure, and the present disclosure encompasses such changed forms.

REFERENCE SIGNS LIST 1 roof side rail
2 roof panel
2a opening
3 front pillar
5 rear pillar
6 front header
6a header gusset
9 second roof reinforcement
15 front-side bracket
15c bead
15f flange portion
16 rear-side bracket
20 roof opening-closing unit
21 glass panel
22 side frame
23 front-side member
30 shade device
33 accommodation portion
V vehicle
F1 vehicle-body framework member
F2 unit framework member

The invention claimed is:

1. An upper vehicle-body structure for a vehicle, the upper vehicle-body structure comprising:
   a cover that fits in an opening in a roof panel of the vehicle;
   a sunroof device that moves the cover between one position in the opening and another position out of the opening; and
   a vehicle-body framework which surrounds an outer edge portion of the opening and in which corner portions are formed in a planar view, wherein
   the sunroof device has a unit framework in which unit corner portions are formed, and
   portions of the unit framework at the unit corner portions are coupled with portions of the vehicle-body framework at the vehicle-body corner portions, respectively, via a pair of front-side brackets and a pair of rear-side brackets,
   the pair of front-side brackets each are fastened to the vehicle-body framework at two vehicle-body-side fastening points aligned in the vehicle width direction,
   the pair of front-side brackets each are fastened to the unit framework at at least two unit-side fastening points aligned in the vehicle front-rear direction, and
   the pair of front-side brackets each comprise a body portion extending in the front-rear direction and a protruding portion protruding from a front-side portion of the body portion to a vehicle-width-direction inner side, and the protruding portion comprises a bolt hole in a vehicle-width direction inner side portion, which corresponds to a unit-side fastening point of the front-side brackets.

2. The upper vehicle-body structure for a vehicle according to claim 1, wherein
a vehicle body has a pair of pillars extending in an up-down direction, and
the portions of the vehicle-body framework at the vehicle-body corner portions are coupled with the pair of pillars.

3. The upper vehicle-body structure for a vehicle according to claim 2, wherein
the vehicle-body framework includes
a pair of roof side rails extending in a vehicle front-rear direction,
a front header that couples front end portions of the pair of roof side rails together in a vehicle width direction, and
a roof reinforcement that couples rear-side intermediate portions of the pair of roof side rails together in the vehicle width direction,
and
the pair of front-side bracket is fastened to the front header at the two vehicle-body-side fastening points aligned in the vehicle width direction.

4. The upper vehicle-body structure for a vehicle according to claim 3, wherein
one vehicle-body-side fastening point of the vehicle-body-side fastening points is disposed in a position at an extension line connecting the two unit-side fastening points, and
a remaining vehicle-body-side fastening point of the vehicle-body-side fastening points is disposed in a position on a vehicle-width-direction outer side of the extension line.

5. The upper vehicle-body structure for a vehicle according to claim 4, wherein the pair of front-side brackets each has a bead extending in the vehicle front-rear direction between the two vehicle-body-side fastening points and a flange portion bent in an up-down direction in a vehicle-width-direction outer side end.

6. The upper vehicle-body structure for a vehicle according to claim 5, wherein
the front header has a pair of left and right front gussets connected with the pair of roof side rails in both end side portions in the vehicle width direction,
the roof reinforcement has a pair of left and right rear gussets connected with the pair of roof side rails in both end side portions in the vehicle width direction,
the front gusset corresponds to the portion at the vehicle-body corner portion on a front side, and
the rear gusset corresponds to the portion at the vehicle-body corner portion on a rear side.

7. The upper vehicle-body structure for a vehicle according to claim 6, wherein
the unit framework includes
a pair of left and right side frames extending in a vehicle front-rear direction,
a front-side member that couples front end portions of the pair of side frames together in a vehicle width direction, and
a shade accommodation portion coupling rear end portions of the pair of side frames together in the vehicle width direction,
a connecting portion between the front-side member and the side frame corresponds to the portion at the unit corner portion on a front side, and
a vehicle-width-direction outer-side portion of the shade accommodation portion corresponds to the portion at the unit corner portion on a rear side.

8. The upper vehicle-body structure for a vehicle according to claim 1, wherein
the vehicle-body framework includes
a pair of roof side rails extending in a vehicle front-rear direction,
a front header that couples front end portions of the pair of roof side rails together in a vehicle width direction, and
a roof reinforcement that couples rear-side intermediate portions of the pair of roof side rails together in the vehicle width direction,
the unit framework is coupled with the vehicle-body framework via a pair of front-side brackets and a pair of rear-side brackets, and
the pair of front-side bracket is fastened to the front header at two vehicle-body-side fastening points aligned in the vehicle width direction.

9. The upper vehicle-body structure for a vehicle according to claim 1, wherein
the unit framework includes
a pair of left and right side frames extending in a vehicle front-rear direction,
a front-side member that couples front end portions of the pair of side frames together in a vehicle width direction, and
a shade accommodation portion coupling rear end portions of the pair of side frames together in the vehicle width direction,
a connecting portion between the front-side member and the side frame corresponds to the portion at the unit corner portion on a front side, and
a vehicle-width-direction outer-side portion of the shade accommodation portion corresponds to the portion at the unit corner portion on a rear side.

10. The upper vehicle-body structure for a vehicle according to claim 2, wherein
the vehicle-body framework includes
a pair of roof side rails extending in a vehicle front-rear direction,
a front header that couples front end portions of the pair of roof side rails together in a vehicle width direction, and
a roof reinforcement that couples rear-side intermediate portions of the pair of roof side rails together in the vehicle width direction,
the unit framework is coupled with the vehicle-body framework via a pair of front-side brackets and a pair of rear-side brackets, and
the pair of front-side bracket is fastened to the front header at two vehicle-body-side fastening points aligned in the vehicle width direction.

11. The upper vehicle-body structure for a vehicle according to claim 2, wherein
the unit framework includes
a pair of left and right side frames extending in a vehicle front-rear direction,
a front-side member that couples front end portions of the pair of side frames together in a vehicle width direction, and a shade accommodation portion coupling rear end portions of the pair of side frames together in the vehicle width direction, a connecting portion between the front-side member and the side frame corresponds to the portion at the unit corner portion on a front side, and a vehicle-width-direction outer-side portion of the shade accommodation portion corresponds to the portion the the unit corner portion on a rear side.

12. The upper vehicle-body structure for a vehicle according to claim 3, wherein a front-side bracket has a bead extending in the vehicle front-rear direction between the two vehicle-body-side fastening points and a flange portion bent in an up-down direction in a vehicle-width-direction outer side end.

13. The upper vehicle-body structure for a vehicle according to claim 3, wherein the front header has a pair of left and right front gussets connected with the pair of roof side rails in both end side portions in the vehicle width direction, the roof reinforcement has a pair of left and right rear gussets connected with the pair of roof side rails in both end side portions in the vehicle width direction, the front gusset corresponds to the portion at the vehicle-body corner portion on a front side, and the rear gusset corresponds to the portion at the vehicle-body corner portion on a rear side.

14. The upper vehicle-body structure for a vehicle according to claim 3, wherein the unit framework includes a pair of left and right side frames extending in a vehicle front-rear direction, a front-side member that couples front end portions of the pair of side frames together in a vehicle width direction, and a shade accommodation portion coupling rear end portions of the pair of side frames together in the vehicle width direction, a connecting portion between the front-side member and the side frame corresponds to the portion at the unit corner portion on a front side, and a vehicle-width-direction outer-side portion of the shade accommodation portion corresponds to the portion at the unit corner portion on a rear side.

15. The upper vehicle-body structure for a vehicle according to claim 8, wherein the front-side brackets are fastened to the unit framework at at least two unit-side fastening points aligned in the vehicle front-rear direction, one vehicle-body-side fastening point of the vehicle-body-side fastening points is disposed in a position an extension line connecting the two unit-side fastening points, and a remaining vehicle-body-side fastening point of the vehicle-body-side fastening points is disposed in a position on a vehicle-width-direction outer side of the extension line.

16. The upper vehicle-body structure for a vehicle according to claim 8, wherein a front-side bracket has a bead extending in the vehicle front-rear direction between the two vehicle-body-side fastening points and a flange portion bent in an up-down direction in a vehicle-width-direction outer side end.

17. The upper vehicle-body structure for a vehicle according to claim 8, wherein the front header has a pair of left and right front gussets connected with the pair of roof side rails in both end side portions in the vehicle width direction, the roof reinforcement has a pair of left and right rear gussets connected with the pair of roof side rails in both end side portions in the vehicle width direction, the front gusset corresponds to the portion at the vehicle-body corner portion on a front side, and the rear gusset corresponds to the portion the vehicle-body corner portion on a rear side.

18. The upper vehicle-body structure for a vehicle according to claim 8, wherein the unit framework includes a pair of left and right side frames extending in a vehicle front-rear direction, a front-side member that couples front end portions of the pair of side frames together in a vehicle width direction, and a shade accommodation portion coupling rear end portions of the pair of side frames together in the vehicle width direction, a connecting portion between the front-side member and the side frame corresponds to the portion at the unit corner portion on a front side, and a vehicle-width-direction outer-side portion of the shade accommodation portion corresponds to the portion at the unit corner portion on a rear side.

19. The upper vehicle-body structure for a vehicle according to claim 10, wherein the front-side brackets are fastened to the unit framework at at least two unit-side fastening points aligned in the vehicle front-rear direction, one vehicle-body-side fastening point of the vehicle-body-side fastening points is disposed in a position at an extension line connecting the two unit-side fastening points, and a remaining vehicle-body-side fastening point of the vehicle-body-side fastening points is disposed in a position on a vehicle-width-direction outer side of the extension line.

20. The upper vehicle-body structure for a vehicle according to claim 11, wherein a front-side bracket has a bead extending in the vehicle front-rear direction between the two vehicle-body-side fastening points and a flange portion bent in an up-down direction in a vehicle-width-direction outer side end.

* * * * *